(12) United States Patent
Chua et al.

(10) Patent No.: US 8,436,631 B2
(45) Date of Patent: May 7, 2013

(54) WAFER STAGE

(75) Inventors: Choon Meng Chua, Singapore (SG); Lian Ser Koh, Singapore (SG); Wah Pheng Chua, Singapore (SG); Chee Hong Jacob Phang, Singapore (SG); Soon Huat Tan, Singapore (SG)

(73) Assignee: Semicaps Pte Ltd, Singapore (SG)

( * ) Notice: Subject to any disclaimer, the term of this patent is extended or adjusted under 35 U.S.C. 154(b) by 997 days.

(21) Appl. No.: 12/483,432

(22) Filed: Jun. 12, 2009

(65) Prior Publication Data

US 2010/0315617 A1    Dec. 16, 2010

(51) Int. Cl.
*G01R 31/00* (2006.01)
(52) U.S. Cl.
USPC .................................... 324/756.01
(58) Field of Classification Search ............. 324/756.01
See application file for complete search history.

(56) References Cited

U.S. PATENT DOCUMENTS

| 6,265,888 B1* | 7/2001 | Hsu ........................ 324/750.05 |
| 7,170,307 B2* | 1/2007 | Strom ..................... 324/750.23 |
| 7,915,909 B2* | 3/2011 | Dunn et al. ............ 324/762.01 |
| 2001/0015651 A1* | 8/2001 | Hembree .................... 324/754 |
| 2004/0155671 A1* | 8/2004 | Halley ........................ 324/755 |
| 2008/0180118 A1* | 7/2008 | Itou et al. .................... 324/754 |
| 2010/0194423 A1* | 8/2010 | Tago et al. .................. 324/765 |

* cited by examiner

*Primary Examiner* — Huy Q Phan
*Assistant Examiner* — Temilade S Rohdes-Vivour
(74) *Attorney, Agent, or Firm* — Volpe and Koenig, P.C.

(57) ABSTRACT

A wafer stage and a method of supporting a wafer for inspection. the wafer stage comprises a platform for supporting a wafer such that a backside of the wafer is suspended above a cavity of the platform; and a support structure disposed substantially within the cavity for supporting a portion of the wafer; wherein the wafer stage is adapted for relative movement of the platform with respect to the support structure for alignment of the wafer with respect to a probe.

16 Claims, 11 Drawing Sheets

WAFER STAGE

FIELD OF INVENTION

The invention broadly relates to a wafer stage and to a method of supporting a wafer for inspection.

BACKGROUND

Integrated circuits (IC) are fabricated on semiconductor wafers. Each die on the wafer is tested and validated prior to dicing and packaging. A typical production test involves electrical testing using a wafer prober docked to an electronic test system (tester).

A probe card comprises a set of contacts or probes on a printed circuit board and is an interface between an electronic test system and a semiconductor wafer. In a wafer prober, the probe card is inserted and held in place. During testing, the wafer is loaded into the wafer prober, vacuum mounted on a wafer chuck and manipulated so that there can be a precise electrical contact between the probe card and the wafer. After a die has been electrically tested the wafer prober moves the next die on the wafer to the probe card and the next test can start.

A wafer test can separate the electrically functional dies from the non-functional. From the failed test patterns, it is possible to identify the functional blocks on the die that fails, but localization of the defect may not be possible. In order to find the cause of the failure and to increase wafer yield, further testing using defect isolation tools and techniques is required.

Defects can be classified as static or dynamic. In static defects, the die can easily be biased into a state where the defect can be measured i.e. short and open circuits, output stuck high or low. Dynamic defects cause otherwise functional dies to fail only at a particular frequency or temperature threshold or sequence of test vectors and loops. Dynamic defects require a tester to recreate. This requires the tester to be docked to a defect isolation tool with wafer probing capability.

In such a defect isolation tool, a scope transport can be located at the back side (i.e.: substrate side) of the wafer and is used to move a microscope to a location of interest on a die under test. Microscopes are used for imaging, and/or delivery of optical stimulus in order to locate defects through the back side of a die.

A wafer stage is used to hold the wafer in place during electrical testing by the wafer prober and image capturing by the microscope.

Figure 1:
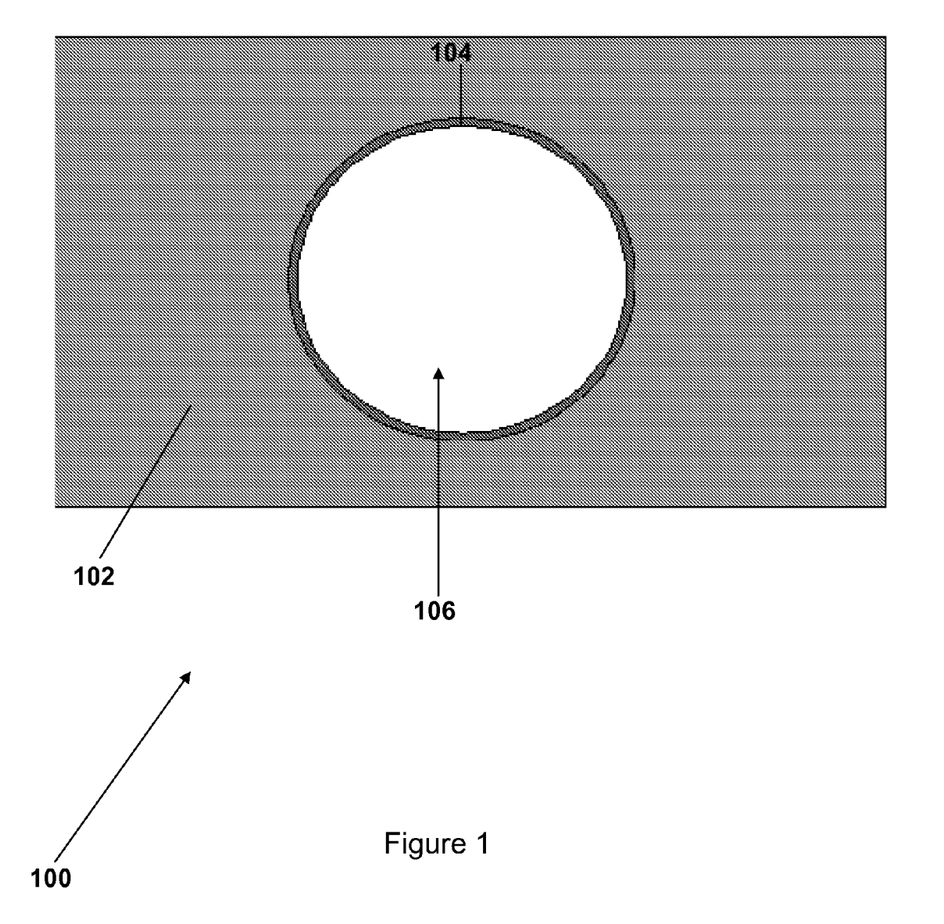
FIG. 1 is a top plan view of a typical wafer stage.

FIG. 1 is a top plan view of a typical semiconductor wafer stage 100, comprising a platform 102 with a cavity 106 and a supporting rim 104. The rim 104 is disposed along the circumference of the cavity 106. A wafer (not shown) can be placed within the cavity 106 and is supported along its circumference by the rim 104. However, the force that a wafer probe exerts onto the wafer can cause the wafer to deform and bend downwards, particularly around the centre where there is a lack of structural support from the rim 104. The deformation can hinder testing by preventing a good electrical contact from forming between the contacts of a probe card and the wafer.

Figure 2:
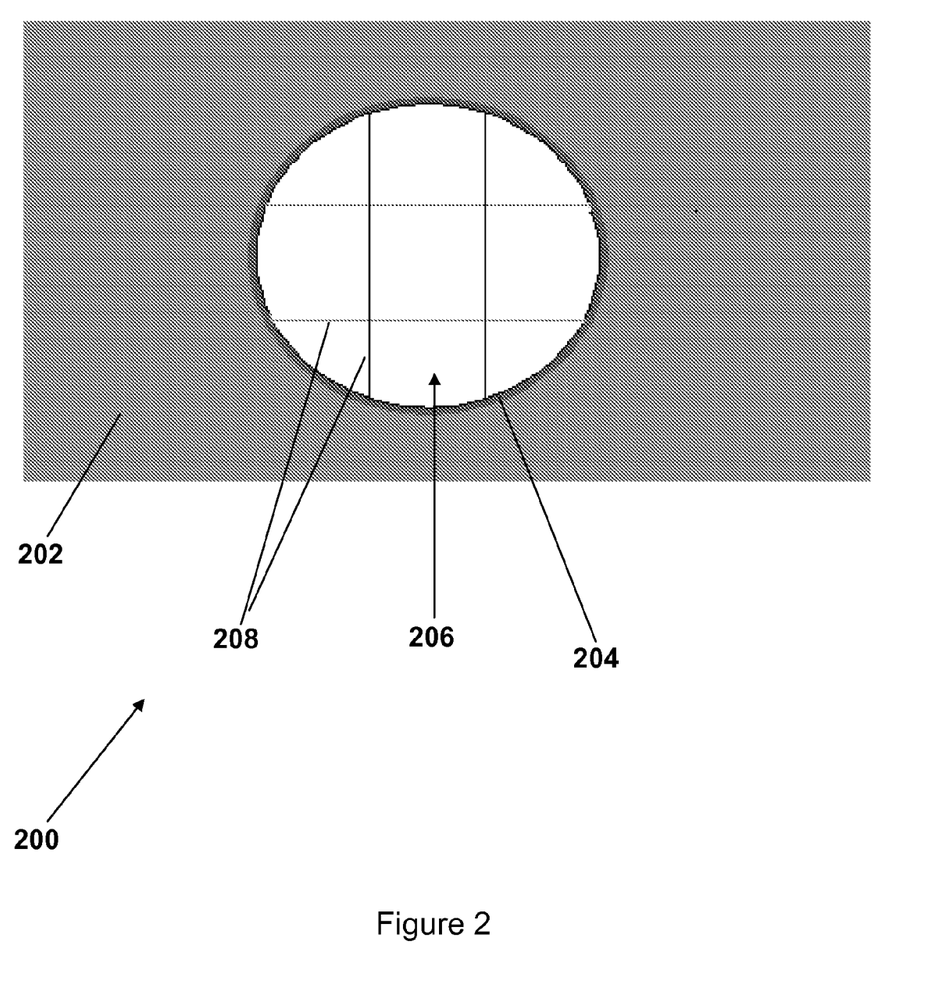
FIG. 2 is a top plan view of another typical wafer stage.

FIG. 2 is a top plan view of another typical wafer stage 200, comprising a platform 202 with a cavity 206, a supporting rim 204 and a network of a plurality of fixed support bars 208. The rim 204 is disposed along the circumference of the cavity 206. The wafer is placed within the cavity 206, above the plurality of fixed support bars 208, and is supported by the fixed support bars 208 and along its circumference by the rim 204. Compared to the wafer stage 100, wafer stage 200 can minimize deformation of the wafer during electrical testing by a wafer probe as it has additional support structures. However, the presence of the support bars 208 on the back side of the wafer means that a location of interest at the back side of the wafer may be obstructed.

Figure 3:
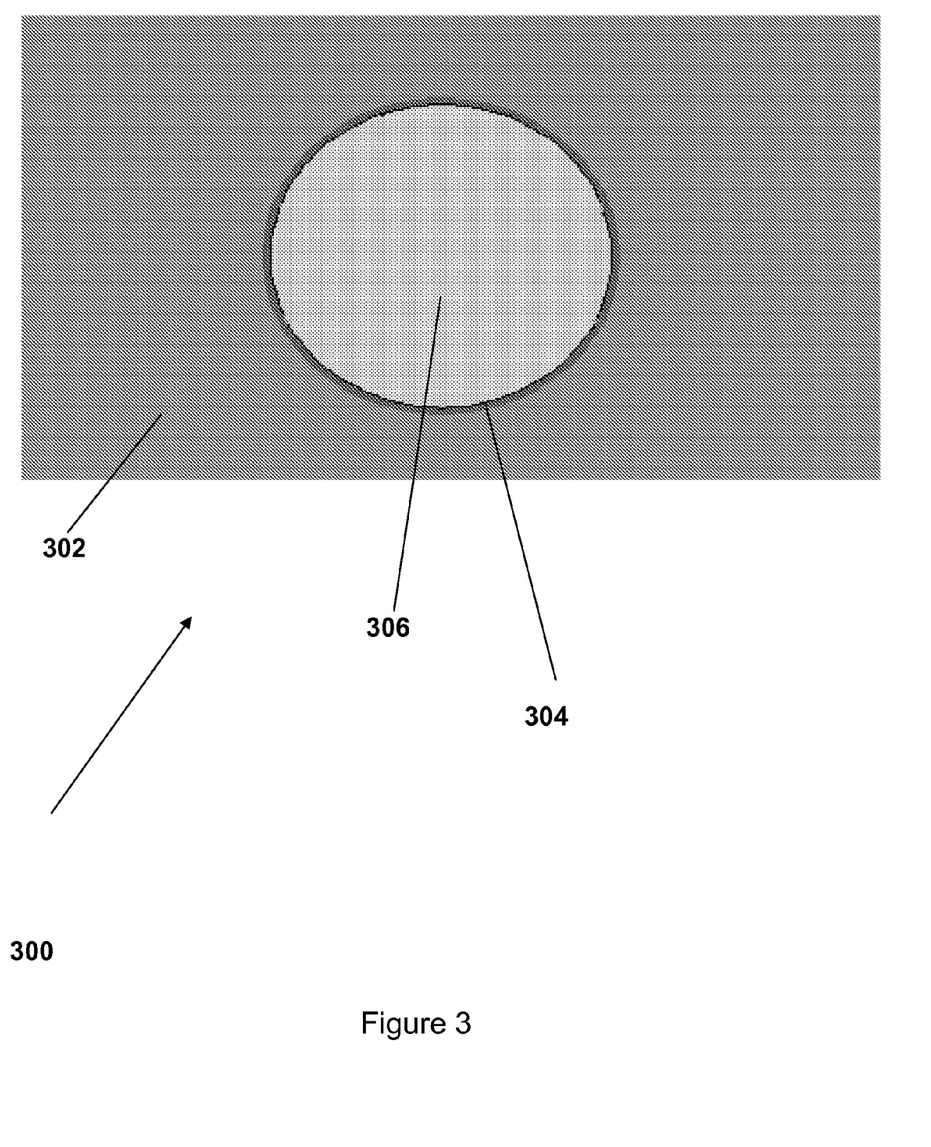
FIG. 3 is a top plan view of another typical wafer stage.

FIG. 3 is a top plan view of another typical wafer stage 300, comprising a platform 302, a supporting rim 304 and a transparent plane parallel plate 306. The transparent plate 306 can be made of a material like glass and can be disposed within the supporting rim 304. The wafer is placed on the plate 306 and is supported by the supporting rim 304 and surface 306. Compared to the wafer stage 200, wafer stage 300 further reduces deformation of the wafer during electrical testing by a wafer probe as the entire back side of the wafer is supported by the plate 306. In addition, the entire back side of the wafer can be observed without obstruction from the plurality of support bars (compare FIG. 2). However, the presence of the transparent plane parallel plate 306 induces optical aberrations and results in microscope images that are aberration limited.

A need therefore exists to provide a wafer stage that seeks to address at least one of the abovementioned problems.

SUMMARY

In accordance with a first aspect of the present invention there is provided a wafer stage, comprising a platform for supporting a wafer such that a backside of the wafer is suspended above a cavity of the platform; and a support structure disposed substantially within the cavity for supporting a portion of the wafer; wherein the wafer stage is adapted for relative movement of the platform with respect to the support structure for alignment of the wafer with respect to a probe.

The support structure may comprise a support bar; and a support element projecting from a top surface of the support bar for supporting the portion of the wafer.

The support element may be hollow and may be disposed around an aperture formed in the support bar enabling an optical inspection of the backside of the wafer through the hollow support element and the aperture.

The support bar may be coupled to an anchor structure for inhibiting movement of the support bar in a plane parallel to the platform.

The anchor structure may be adapted for allowing movement of the support structure in a direction perpendicular to said plane parallel to the platform.

The support bar may be received in two slots formed in the platform and aligned across the cavity.

The hollow support may be coated with or formed from static dissipating low-friction material.

The support bar may be coated with or formed from the static dissipating low-friction material.

The static dissipating low-friction material may comprise PEEK Bearing Grade or Static-Dissipative Acetal Copolymer.

In accordance with a second aspect of the present invention there is provided a method of supporting a wafer for inspection, the method comprising the steps of supporting the wafer such that a backside of the wafer is suspended above a cavity of a platform; providing a support structure disposed substantially within the cavity for supporting a portion of the wafer; and effecting relative movement of the platform with respect to the support structure for alignment of the wafer with respect to a probe.

The support structure may comprise a support bar and a hollow support element disposed around an aperture formed in the support bar and projecting from a top surface of the support bar, and the method may further comprise performing an optical inspection of the backside of the wafer through the hollow support element and the aperture.

BRIEF DESCRIPTION OF THE DRAWINGS

Example embodiments of the invention will be better understood and readily apparent to one of ordinary skill in the art from the following written description, by way of example only, and in conjunction with the drawings, in which:

FIG. 5b is a perspective cross sectional view of the wafer stage of FIG. 5a.

DETAILED DESCRIPTION

The example embodiments described provide a wafer stage comprising a platform for supporting a wafer such that the wafer is suspended above a cavity of the platform and a support structure disposed substantially underneath the cavity. The wafer stage is adapted for relative movement with respect to the platform and for supporting a portion of the wafer.

Figure 4:
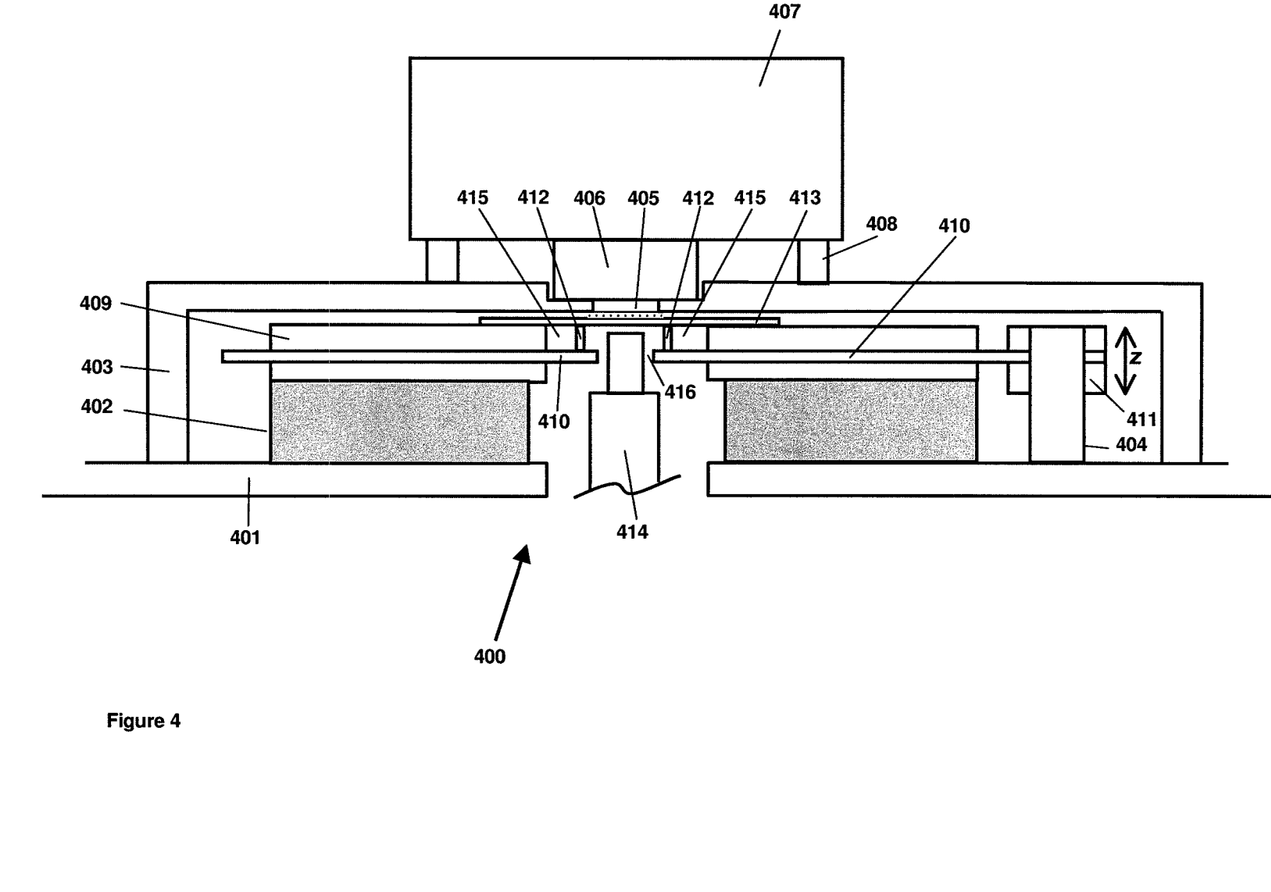
FIG. 4 is a schematic cross sectional view of a wafer stage according to an embodiment of the present invention.

FIG. 4 is a schematic cross sectional view of a wafer stage 400 according to an embodiment of the present invention. The wafer stage 400 advantageously allows optical access to the back side of the wafer 413 and comprises a base plate 401, the base plate 401 supporting a wafer transport 402, a bridge structure 403 and an anchor element 404. A wafer probe card 405 is secured to the bridge structure 403 and a tester interface 406 is connected to the probe card 405 from above. An electronic test system (tester) test head 407 is aligned to guide pins 408, and can be lowered onto and locked to the tester interface 406 for interconnection. The wafer transport 402 allows X, Y, Z and Theta movements and supports a wafer holder 409. On the wafer holder 409, the wafer 413 is suspended across a cavity 415. The wafer transport 402 moves to align a selected die on the wafer 413 for electrical contact with the wafer probe card 405. A support bar 410 is disposed within a slot formed in the wafer holder 409 and is constrained to move substantially only in the Z direction by the anchor element 404 with a vertically positioned linear guide 411.

An opening 416 on the support bar 410 is centered about the wafer probe card 405. A support ring 412 is disposed around the circumference of the opening 416 and projects from the top surface of the support bar 410 and abuts the back side of the wafer 413. The top surface of the support ring 412 is flush with the top surface of the wafer holder 409. The constraint on the support bar 410 due to the anchor 404 advantageously allows the support ring 412 to remain stationary in the X and Y direction and thus to the wafer probe card 405.

In operation, the wafer 413 is moved by the wafer transport 402 in the X, Y or Theta direction with respect to the wafer probe card 405 and support ring 412. After alignment, the wafer transport 402 moves in the Z direction to contact the selected die on the wafer 413 to the probe pins of the wafer probe card 405, and the support bar 410 and support ring 412 move together with the wafer holder 409. At the contact position, the support ring 412 advantageously prevents the wafer 413 from bending due to the force exerted by the probe pins. An optical lens 414 that is mounted on a scope transport (not shown) can now be moved into position to image the back side of the wafer 413 through the opening 416 on the support bar 410 and through the support ring 412.

Figure 5A:
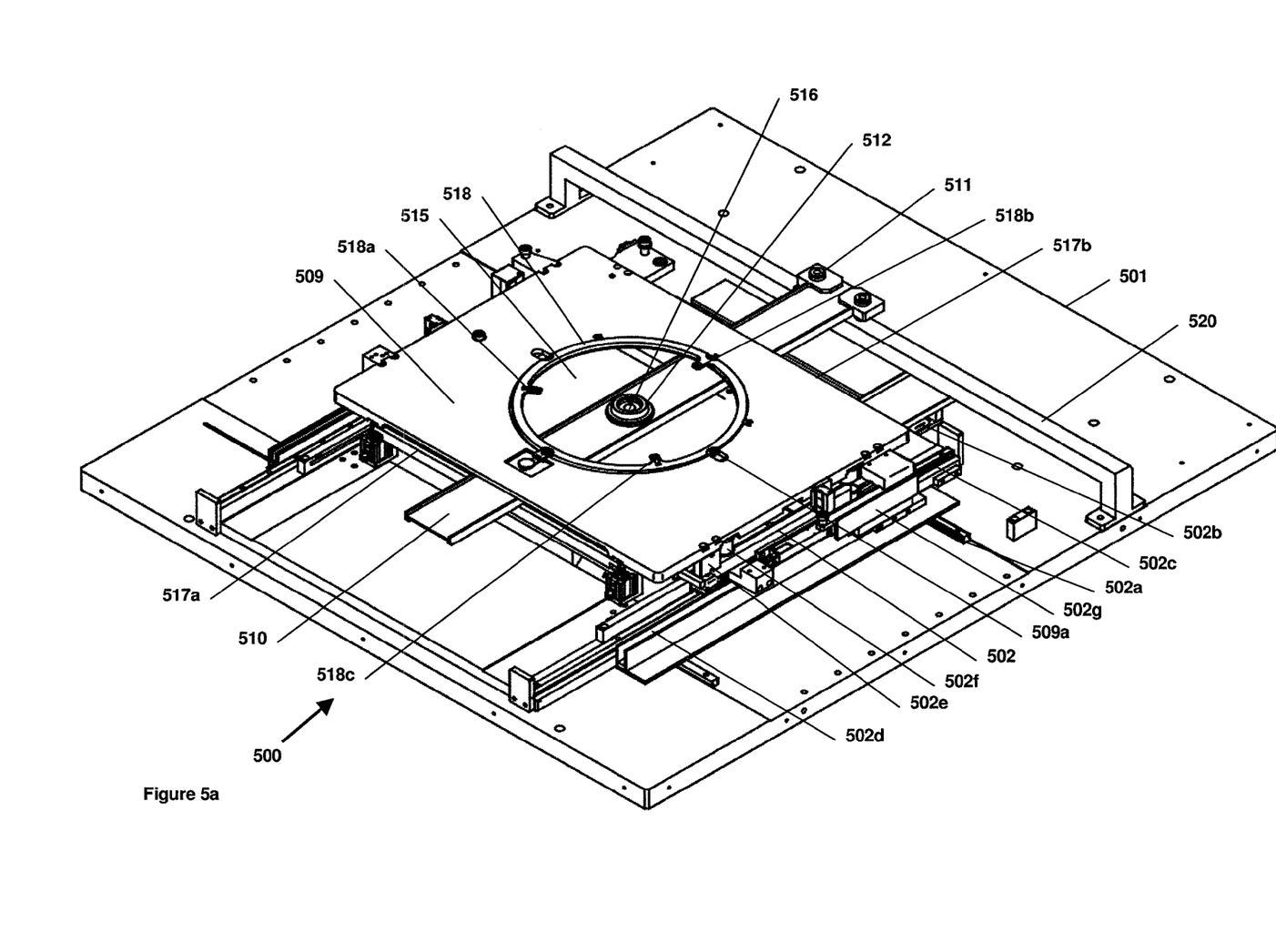
FIG. 5a is a perspective view of part of a wafer stage according to an embodiment of the present invention.
Figure 5B:
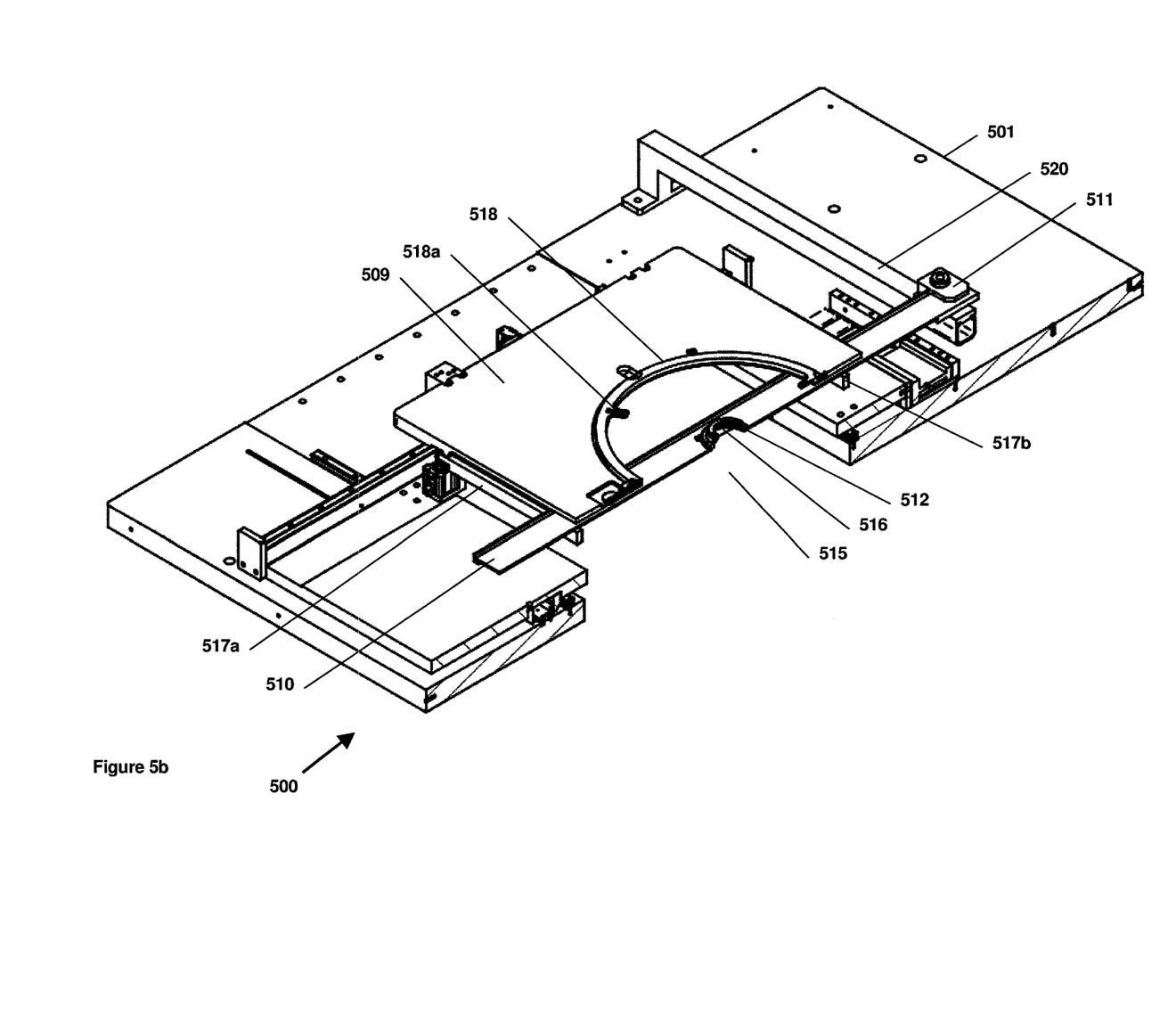

FIGS. 5a and 5b are a perspective view and a perspective cross sectional view respectively of a detail of an embodiment of a semiconductor wafer stage 500, comprising a wafer holder 509 with a cavity 515, a wafer ring 518 mounted at a circumference of the cavity 515 for receiving and supporting a wafer (not shown), and a support bar 510. Slots 517a and b are provided within the wafer holder 509 and aligned across the cavity 515. In FIGS. 5a and 5b, the wafer probe card, bridge structure, tester interface and electronic test system (tester) test head (compare FIG. 4) have been omitted for better clarity.

The wafer holder 509 is supported by a wafer transport 502 with X, Y, Z and Theta movement. Wafer rings 518 of different inner diameter according to the size of a wafer undergoing testing can be selectively mounted to the wafer holder 509, using latches e.g. 509a in the example embodiment. In this embodiment, the wafer ring 518 supports the wafer at three points, more particular at prongs or protrusions 518a, b, and c.

The support bar 510 is disposed within the wafer holder 509 in the slot 517; and has one end attached to a linear guide 511. A hollow support element here in the form of a support ring 512 is provided on the support bar 510. The support ring 512 is formed on the top surface of the support bar 510, projecting substantially upwards, and approximately at the support bar's 510 mid-point. The support bar 510 comprises an aperture 516 aligned with the support ring 512 enabling optical inspection of the backside of a wafer (not shown) through the support ring 512 and the aperture 516. The support ring 512 in this example embodiment is flush with the top surface of the wafer ring 518 and prongs 518a, b, c.

The support ring 512 is advantageously coated with or formed from a static dissipating low-friction material such as PEEK Bearing Grade, or Static-Dissipative Acetal Copolymer, or other similar engineering plastic materials. PEEK Bearing Grade reduces friction between the support ring 512 and the back side of the wafer (not shown). Similarly, the support bar 510 or the slot 517 may be coated with or formed from a static dissipating low-friction material such as PEEK Bearing Grade to reduce friction between the support bar 510 and the wafer holder 509. As will be appreciated by a person skilled in the art, the support bar 510 thus advantageously remains stationary while the wafer transport 502 moves in the X and Y directions during alignment of a selected die with a probe card (not shown). The thickness of the slot is preferably only slightly larger than the thickness of the support bar 510 to facilitate X and Y movement of the wafer holder 509 while preferably substantially minimizing any Z movement or play. The support bar 510 is coupled to an anchor element 520 mounted on a base 501 via the linear guide 511. The anchor element 520 holds the support bar 510 stationary, in the X and Y directions, with respect to the probe pins of the wafer probe card (not shown), while allowing the wafer transport 502 and wafer holder 509 to position the selected die in the X or Y direction for alignment with the probe pins. On the other hand, the linear guide 511 allows the support bar 510 to move together with the wafer transport 502, wafer holder 509 and wafer (not shown) in the Z direction to make contact with the probe pins.

The support ring 512 is in contact with and supporting the wafer during probing. This advantageously allows the support ring 512 to continuously support the selected die on the wafer undergoing testing so that bending induced by the probe card is minimized. This can ensure a good electrical contact between the probe pins and the die.

In the example embodiment, the X movement is implemented by way of a pair of linear guides 502a and a linear servomotor 502b. The Y movement is implemented by way of a pair of linear guides 502c and a pair of linear servomotors 502d. The Z movement is implemented by way of four linear guides 502e and four voice coils 502f. The Theta movement is implemented by way of a pair of curved guides (not shown) and a linear servomotor 502g coupled to the wafer holder 509. The movement axes are stacked in the order X, Y, Theta and Z.

The wafer transport 502, wafer holder 509, support ring 512 and support bar 510 are fabricated from aluminum in the example embodiment. However, it will be appreciated that other materials may be used in different embodiments.

Figure 6:
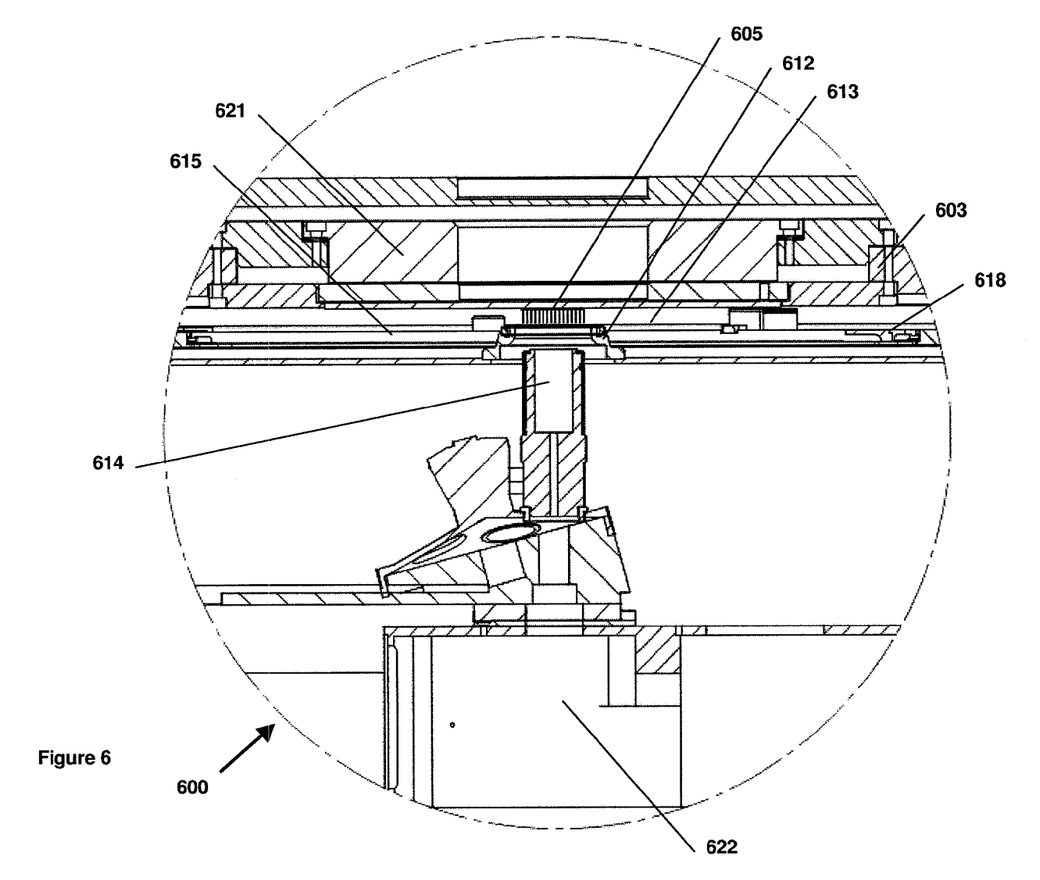
FIG. 6 is a cross sectional view of a detail of the wafer stage according to an example embodiment.

FIG. 6 is a cross sectional view of a details of a wafer stage according to an example embodiment showing the wafer prober interface 621 and probe card 605. The wafer prober interface 621 is supported by a bridge structure (or headplate) 603. A wafer 613 is placed across the cavity 615 and supported by the wafer ring 618 and the support ring 612. During testing of a plurality of dies on the wafer 613, the wafer transport (not shown) sequentially positions each die on the wafer 613 to be tested underneath the probe card 605. As described above, the support ring 612 remains stationary in the X and Y directions with respect to the probe card 605. This advantageously allows the support ring 612 to continuously support a perimeter around the die being probed by the probe card 605. A microscope lens 614 is disposed below the wafer 613 and the support ring 612, to facilitate observation of the back-side of the corresponding die undergoing electrical testing. The microscope lens 614 is mounted on a scope transport 622, which is independent of the wafer transport, and can move to and focus on a region of interest on the die.

Figure 7:
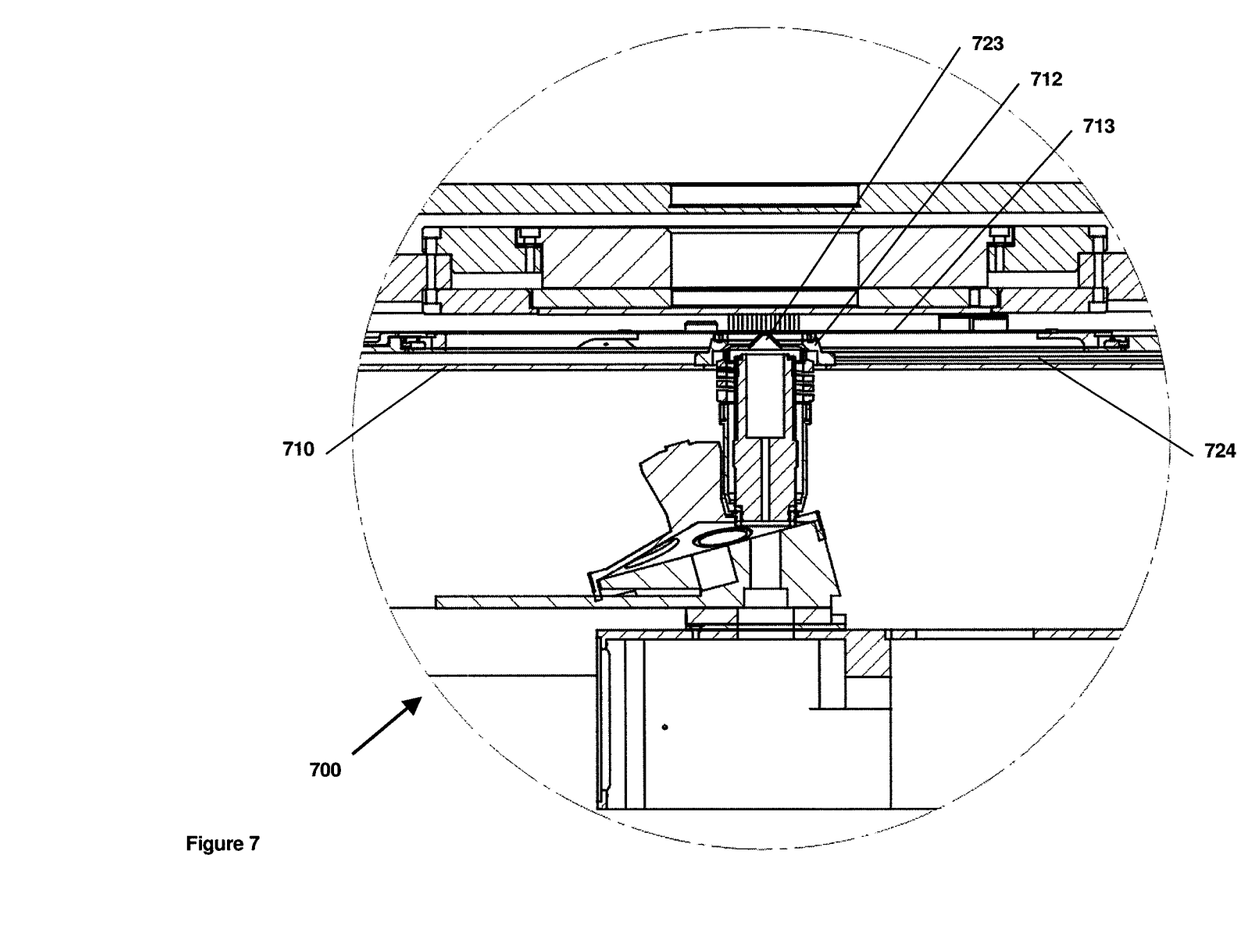
FIG. 7 is a cross sectional view of a detail of a wafer stage according to an alternate embodiment of the present invention.

FIG. 7 shows a cross sectional view of a wafer stage according to an alternate embodiment of the present invention, comprising a vacuum suction means incorporated in a support ring 712, such that the support ring 712 facilitates in immobilizing a wafer 713. The vacuum suction means advantageously provides a suction force to prevent lift-off of the wafer 713. For example, when a solid immersion lens (SIL) 723 is used for optical imaging, it has to be pressed against the back side of the wafer 713 to eliminate the air gap between the surface of the SIL 723 and the wafer 713. In this instance, the suction force to counter the force exerted by the SIL 723 prevents the wafer 713 from lifting-off. In this embodiment, the vacuum suction means is in the form of a plurality of vacuum tubing e.g. 724 disposed within the support bar 710 and coupled to internal vacuum conduits in the support ring 712.

Figure 8:
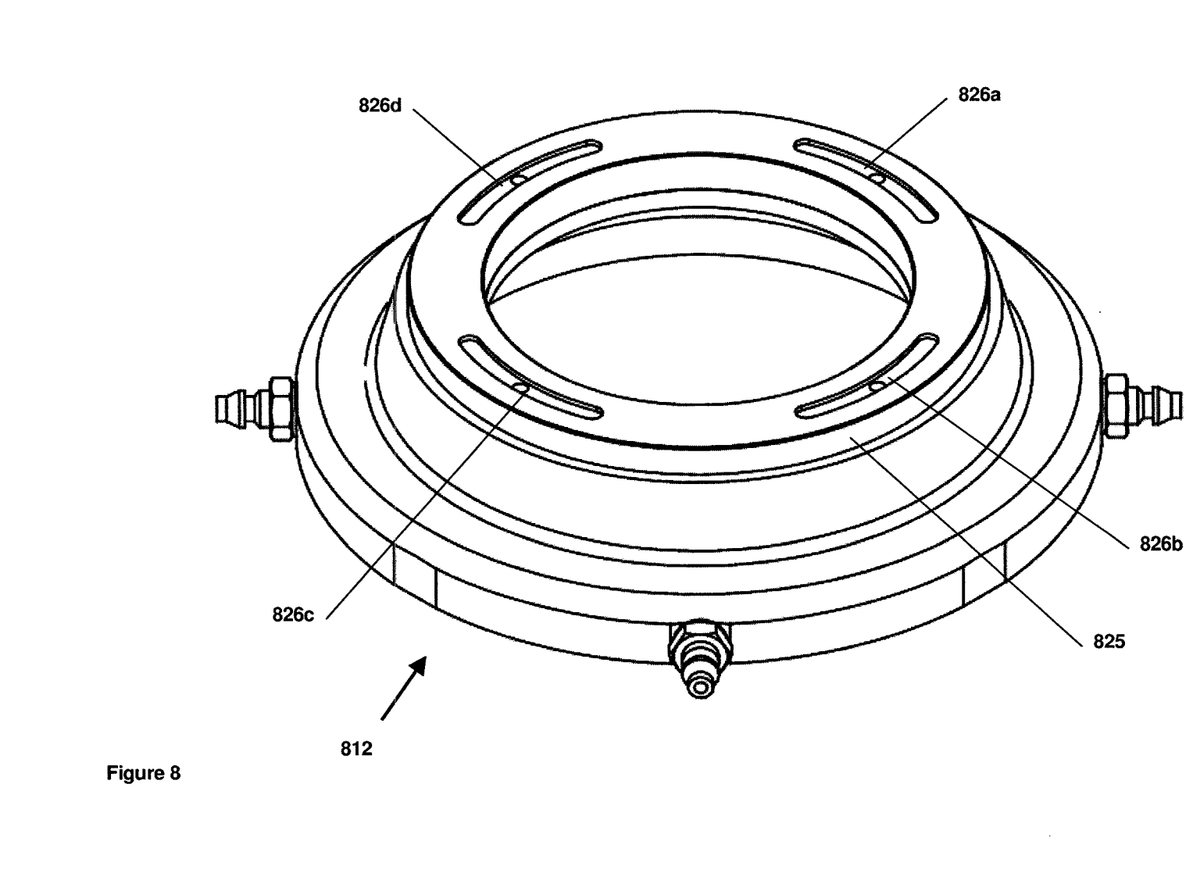
FIG. 8 is a perspective view of a support ring with vacuum chuck for use with a wafer stage according to an example embodiment.

FIG. 8 is a perspective view of a support ring 812 for a wafer stage according to an example embodiment, comprising a rim 825 disposed on the support ring's 812 top surface. The support ring 812 and rim 825 comprises four cavities 826a/826b/826c/826d to enable air to be sucked out by one or more vacuum pumps (not shown) via the vacuum tubing (compare e.g. 724 FIG. 7). During probing of dies at the edge of a wafer, the whole rim 825 may not be in contact with the back side of the wafer. By selectively evacuating the cavities which remain in contact, the support ring is still advantageously able to immobilize the wafer.

Figure 9:
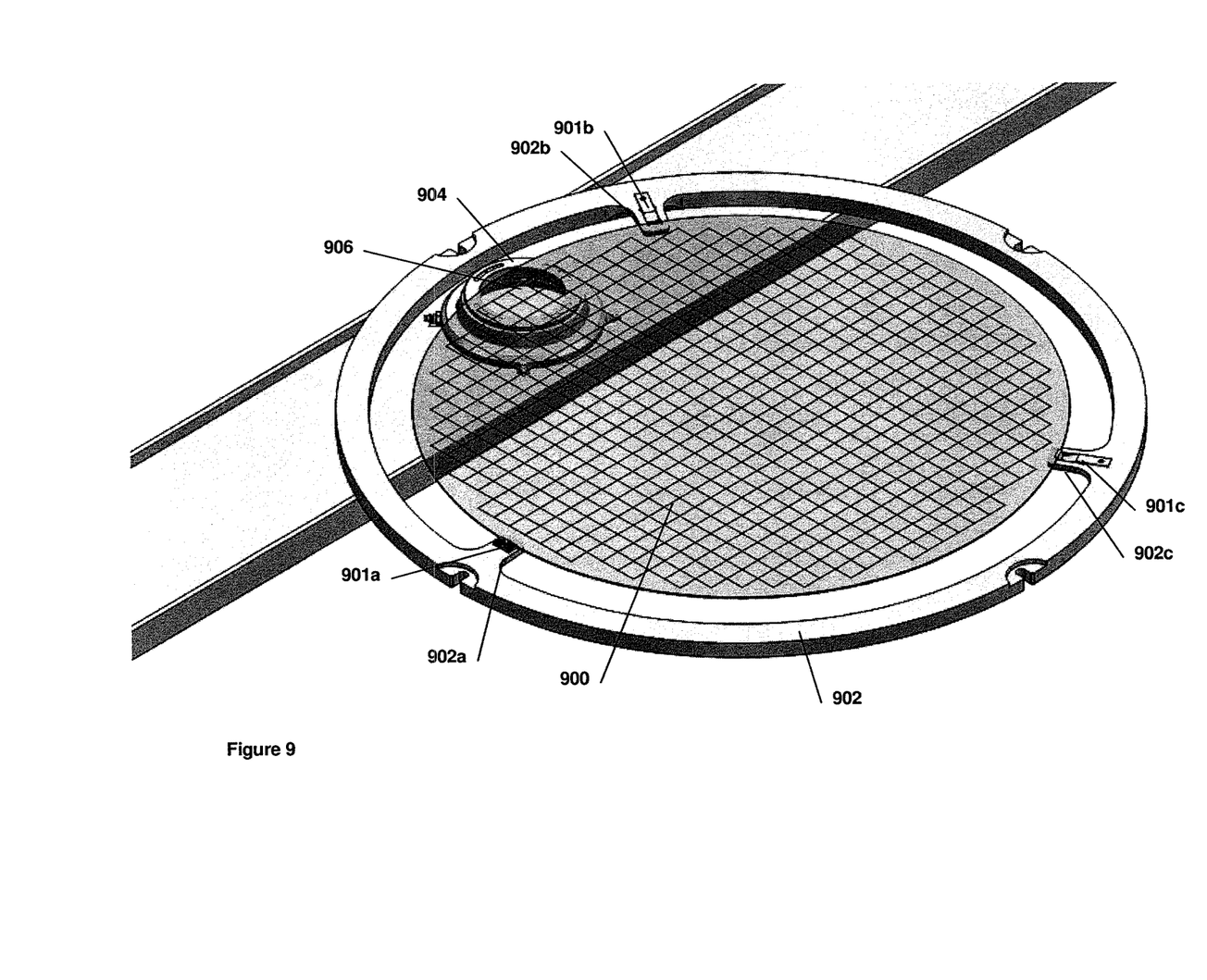
FIG. 9 shows a detail of the wafer stage according to an example embodiment.

With reference to FIG. 9, the wafer 900 is supported at three points 902a, b, and c by the wafer ring 902, and held in place using stoppers 901a, b, and c in this example implementation. The support ring 904 has a minimum clear aperture to accommodate the microscope objective (not shown). When probing edge dies e.g. 906, part of the support ring 904 is not under the wafer 900. By selectively evacuating the cavities that remain in contact, the support ring 904 is still advantageously able to immobilize the wafer. With this arrangement, while the some dies near the three support points 902a, b, and c may still not be probed, this number is advantageously minimal compared to a scenario where the entire circumference of the wafer is supported.

Figure 10:
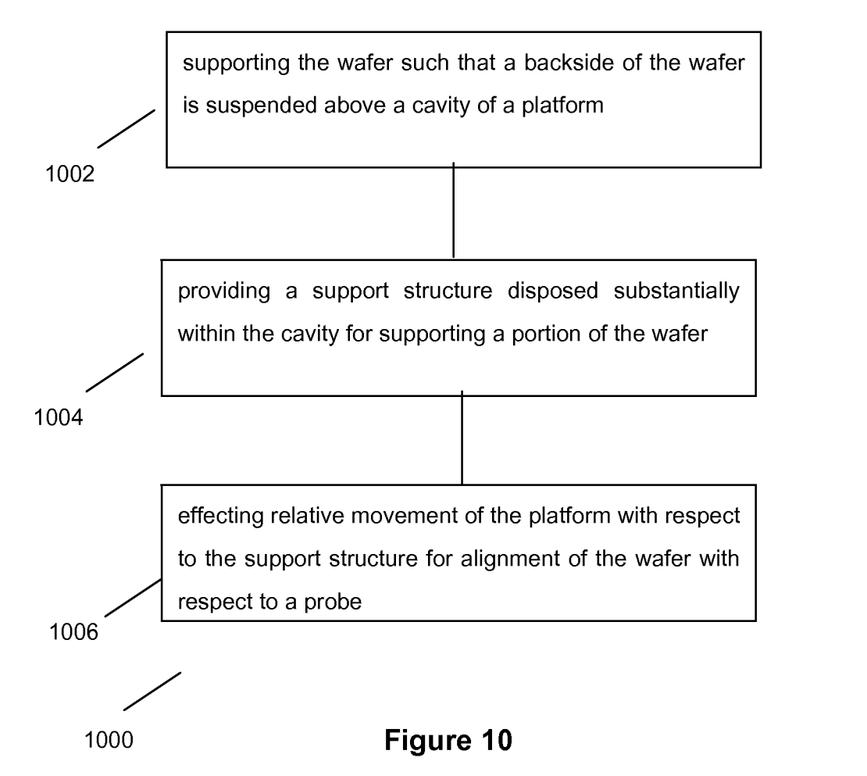
FIG. 10 shows a flow-chart illustrating a method of supporting a wafer for inspection according to an example embodiment.

FIG. 10 shows a flow chart 1000 illustrating a method of supporting a wafer for inspection according to an example embodiment. At step 1002, the wafer is supported such that a backside of the wafer is suspended above a cavity of a platform. At step 1004, a support structure disposed substantially within the cavity is provided for supporting a portion of the wafer. At step 1006, relative movement of the platform with respect to the support structure is effected for alignment of the wafer with respect to a probe.

Embodiments of the present invention can advantageously provide continuous structural support around an area of a wafer undergoing testing so that deformation of the wafer may be minimized. This can ensure good electrical contact between the probe card and the die under test. Further, the absence of fixed support structures on the back side of the wafer may advantageously allow substantially all areas on the back side of the wafer to be observed without or with reduced obstructions and may also allow a microscope to move without or with reduced impediment in an X or Y direction during testing. In addition, optical aberrations may be minimized because no intermediate transparent element is present between wafer and the lens of the microscope.

It will be appreciated by a person skilled in the art that numerous variations and/or modifications may be made to the present invention as shown in the embodiments without departing from a spirit or scope of the invention as broadly described. The embodiments are, therefore, to be considered in all respects to be illustrative and not restrictive.

The invention claimed is:
1. A wafer stage, comprising:
a platform for supporting a wafer such that a backside of the wafer is suspended above a cavity of the platform;
a support structure disposed substantially within the cavity, wherein an opening is formed in the support structure;
a support element disposed around the opening formed in the support structure, a top surface of the support element for supporting a portion of the wafer, wherein the top surface of the support element has one or more cavities; and a vacuum suction means incorporated in the support element, the vacuum suction means enabling at least partial air evacuation of the one or more cavities of the support substrate that are in contact with the portion of the wafer, wherein the wafer stage is adapted for relative movement of the platform with respect to the support structure for alignment of the wafer with respect to a probe.

2. The wafer stage according to claim 1, wherein the support structure comprises:
a support bar; and
the support element projects from a top surface of the support bar for supporting the portion of the wafer.

3. The wafer stage according to claim 2, wherein the support element is hollow and enables an optical inspection of the backside of the wafer through the hollow support element and the aperture.

4. The wafer stage according to claim 2, wherein the support bar is coupled to an anchor structure for inhibiting movement of the support bar in a plane parallel to the platform.

5. The wafer stage according to claim 2, wherein the support bar is received in two slots formed in the platform and aligned across the cavity.

6. The wafer stage according to claim 2, wherein the hollow support is coated with or formed from a static dissipating low-friction material.

7. The wafer stage according to claim 2, wherein the vacuum suction means is in the form of a plurality of vacuum tubing disposed within the support structure and coupled to internal vacuum conduits in the support element.

8. The wafer stage according to claim 2, wherein the support element is in the form of a support ring.

9. The wafer stage according to claim 2, wherein the support element has a clear aperture that allows a lens to pass through to press against the back side of the wafer.

10. The wafer stage according to claim 4, wherein the anchor structure is adapted for allowing movement of the support structure in a direction perpendicular to said plane parallel to the platform.

11. The wafer stage according to claim 6, wherein the support bar is coated with or formed from the static dissipating low-friction material.

12. The wafer stage according to claim 11, wherein the static dissipating low-friction material comprises PEEK Bearing Grade or Static-Dissipative Acetal Copolymer.

13. A method of supporting a wafer for inspection, the method comprising the steps of:
supporting the wafer such that a backside of the wafer is suspended above a cavity of a platform;
providing a support structure disposed substantially within the cavity, wherein an opening is formed in the support structure;
providing a support element disposed around the opening formed in the support structure, a top surface of the support element for supporting a portion of the wafer;
providing one or more cavities in the top surface of the support element;
providing a vacuum suction means incorporated in the support element, the vacuum suction means enabling at least partial air evacuation of the one or more cavities of the support substrate that are in contact with the portion of the wafer; and
effecting relative movement of the platform with respect to the support structure for alignment of the wafer with respect to a probe.

14. The method according to claim 13, wherein the support structure comprises a support bar and a hollow support element disposed around an aperture formed in the support bar and projecting from a top surface of the support bar, and the method further comprises performing an optical inspection of the backside of the wafer through the hollow support element and the aperture.

15. The method according to claim 13, further comprising the steps of:
providing a clear aperture in the support element; and
allowing a lens to pass through the clear aperture in the support element to press against the back side of the wafer.

16. The method of claim 15, wherein the lens is a solid immersion lens.

* * * * *